US011924625B2

(12) United States Patent
Zheng et al.

(10) Patent No.: US 11,924,625 B2
(45) Date of Patent: Mar. 5, 2024

(54) METHOD AND SYSTEM FOR ROOM CALIBRATION IN A SPEAKER SYSTEM

(71) Applicant: HARMAN INTERNATIONAL INDUSTRIES, INCORPORATED, Stamford, CT (US)

(72) Inventors: Jianwen Zheng, Guangdong (CN); Shao-Fu Shih, San Jose, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 93 days.

(21) Appl. No.: 17/614,963

(22) PCT Filed: May 30, 2019

(86) PCT No.: PCT/CN2019/089299

§ 371 (c)(1),
(2) Date: Nov. 29, 2021

(87) PCT Pub. No.: WO2020/237576

PCT Pub. Date: Dec. 3, 2020

(65) Prior Publication Data

US 2022/0240040 A1 Jul. 28, 2022

(51) Int. Cl.
*H04S 7/00* (2006.01)
*H04R 5/02* (2006.01)
*H04R 5/04* (2006.01)

(52) U.S. Cl.
CPC ............... *H04S 7/301* (2013.01); *H04R 5/02* (2013.01); *H04R 5/04* (2013.01); *H04S 7/305* (2013.01); *H04S 2400/13* (2013.01); *H04S 2400/15* (2013.01)

(58) Field of Classification Search
CPC . H04S 7/301; H04S 7/305; H04S 5/00; H04S 7/00; H04R 5/02; H04R 5/04
USPC .................................................... 381/18, 303
See application file for complete search history.

(56) References Cited

U.S. PATENT DOCUMENTS

| | | | | |
|---|---|---|---|---|
| 10,229,698 | B1 * | 3/2019 | Chhetri | H04R 3/005 |
| 10,299,061 | B1 | 5/2019 | Sheen | |
| 2014/0177847 | A1 | 6/2014 | Strub | |
| 2014/0185819 | A1 * | 7/2014 | Gleissner | H04R 1/1083 381/71.6 |

(Continued)

FOREIGN PATENT DOCUMENTS

| | | | |
|---|---|---|---|
| CN | 1802034 | A | 7/2006 |
| CN | 105187993 | A | 12/2015 |
| CN | 106658327 | A | 5/2017 |

(Continued)

OTHER PUBLICATIONS

International Search Report and Written Opinion dated Feb. 26, 2020 for PCT Application No. PCT/CN2019/089299 filed May 30, 2019, 9 pages.

(Continued)

*Primary Examiner* — Yosef K Laekemariam
(74) *Attorney, Agent, or Firm* — Brooks Kushman P.C.

(57) ABSTRACT

The present disclosure is related to a method and system for a room calibration in a speaker system using an internal microphone. The method comprises calculating an impulse response of a sound signal received at an internal microphone from at least one speaker, and performing the room calibration based on the calculated impulse response.

15 Claims, 4 Drawing Sheets

(56) References Cited

U.S. PATENT DOCUMENTS

| | | | | |
|---|---|---|---|---|
| 2016/0021473 | A1 | 1/2016 | Riggi et al. | |
| 2017/0053641 | A1* | 2/2017 | Kamdar | G10K 11/178 |

FOREIGN PATENT DOCUMENTS

| | | | | |
|---|---|---|---|---|
| CN | 107690121 | A | 2/2018 | |
| CN | 109791193 | A | 5/2019 | |
| GB | 2543577 | * | 4/2017 | E04H 1/12 |

OTHER PUBLICATIONS

Office Action for Chinese Application No. 201980095449.1 filed Oct. 14, 2021, dated Apr. 21, 2023, 9 pgs.

* cited by examiner

METHOD AND SYSTEM FOR ROOM CALIBRATION IN A SPEAKER SYSTEM

CROSS-REFERENCE TO RELATED APPLICATIONS

This application is the U.S. national phase of PCT Application No. PCT/CN2019/089299 filed on May 30, 2019, the disclosure of which is hereby incorporated in its entirety by reference herein.

TECHNICAL FIELD

The present invention relates to a method and a system for room calibration in a speaker system, and specifically relates to a method and a system for room calibration using an internal microphone inside the speaker system.

BACKGROUND

For the past few decades, it has been generally acknowledged that steady state impulse responses measured with one or several omnidirectional microphones at the listening area in a room can provide information as to how the speaker system will sound. Compared with the measurement during the product development, it will become much different in a user's room. Therefore, in-situ measurements need to be performed and accordingly an equalization and a delay of the input signal will be changed so that the measured response matches a target curve, and thus imperfections in loudspeakers and room environments can be repaired. This aspect is generally defined as Room Calibration. However, measuring response at the listening area usually entails that one or more external microphones along with some wires outside the speaker product is required which may be inconvenient.

In the past few years, a soundbar system has been widely used as a home theater. To provide a more real surround experience for the listeners, some soundbar designs optimize the directivity of speaker, for instance, we may use two side-firing tweeters on both sides of the soundbar may be used. It strengthens the sideward directivity while limiting the forward directivity with respect to the listening area, so the sound arriving at this area is mostly the sound reflection from the two sidewalls. The listener could find the virtual sound source on the sidewalls and thus feel that the sound field has expanded. However, if the soundbar is not on the symmetry axis of the room, the distances between the soundbar and the two sidewalls are not the same. So the left and right sound reflections become unbalanced as shown in FIG. 1.

To balance the left and right sound reflection, a room calibration method is considered. In a traditional room calibration method, there should be at least one external microphone in the listening area with long wires from the soundbar system, since the at least one external microphone can measure the sound at the desired position in the listening area and transmit the sound back to the system. Hence, the user can find out what the acoustic performance is in the listening area in this room. However, the external microphones and long wires may not be optimal because users may throw the wires away after calibration.

Therefore, there is a need to develop an improved room calibration method and system that can be convenient and effective for a user to perform in-situ measurements and accordingly perform a room calibration so as to obtain better sound experience.

SUMMARY

According to one aspect of the disclosure, a method for a room calibration in a speaker system is provided. The method comprises: calculating an impulse response of a signal received at an internal microphone from at least one speaker; and performing the room calibration based on the calculated impulse response.

Preferably, the internal microphone is positioned on a surface of a soundbar in the speaker system or the internal microphone is positioned inside one of the at least one speaker in the speaker system.

Preferably, calculating the impulse response of a signal received at the internal microphone from at least one speaker comprises: playing a forward sweep signal by one of the at least one speaker; recording a sound signal from the one of the at least one speaker by the internal microphone; and convolving an inverse of the forward sweep signal with the sound signal recorded by the internal microphone.

Preferably, calculating the impulse response of the signal received at the internal microphone from one of the at least one speaker comprises:

calculating the impulse response of the signal received at the internal microphone from one of the at least one speaker by an Acoustic Echo Cancellation (AEC) module.

Preferably, the at least one speaker comprises a left speaker and a right speaker, and the impulse response comprises a left impulse response and a right impulse response.

Preferably, the method further comprises calibrating a delay between the left speaker and the right speaker at a listener area, respectively based on the calculated left impulse response and the calculated right impulse response.

Preferably, the method further comprises calibrating a left gain of the left speaker and a right gain of the right speaker, respectively based on the calculated left impulse response and the calculated right impulse response.

Preferably, the method further comprises calibrating a left equalization of the left speaker and a right equalization of the right speaker, respectively based on the calculated left impulse response and the calculated right impulse response.

According to another aspect of the disclosure, a system for a room calibration in a speaker system is provided. The system comprises an internal microphone configured to recording a sound signal from at least one speaker; and a processor. The processor is configured to calculate an impulse response of the sound signal received at an internal microphone; and perform the room calibration based on the calculated impulse response.

According to another aspect of the disclosure, a computer readable media having computer-executable instructions for performing the above said method is provided.

Advantageously, the disclosed room calibration method and system in the aforesaid aspects of the present disclosure may realize an improved room calibration method and system that can be convenient and effective for a user to perform in-situ measurements and accordingly perform a room calibration so as to obtain better sound experience.

The systems, methods, features and advantages will be, or will become, apparent to one with skill in the art upon examination of the following figures and detailed description. It is intended that all such additional systems, methods, features and advantages be included within this description, be within the scope of the invention.

BRIEF DESCRIPTION OF THE DRAWINGS

The features, nature, and advantages of the present application may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
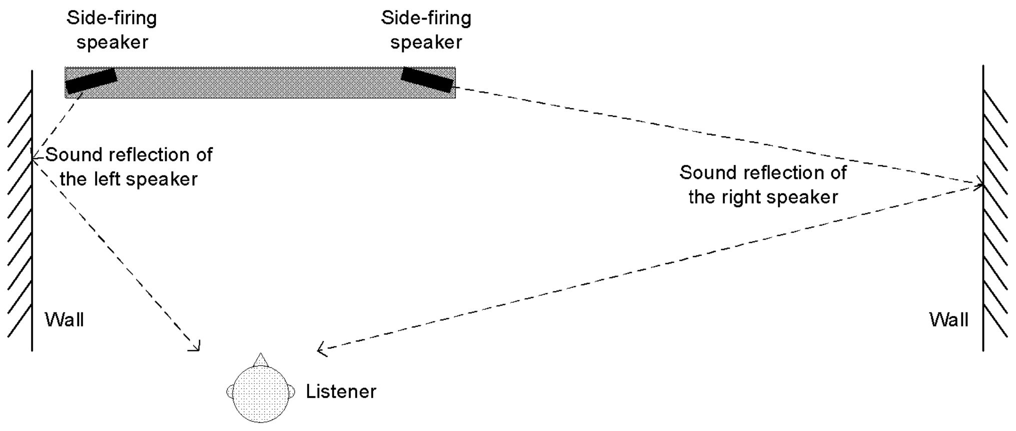
FIG. 1 illustrates a schematic view, which shows a case where the left and the right sound reflections become unbalanced if the distances between the soundbar and the two sidewalls are not the same.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. One or more functional blocks or units may also be implemented in a common circuit, chip, circuit element or unit.

Figure 2:
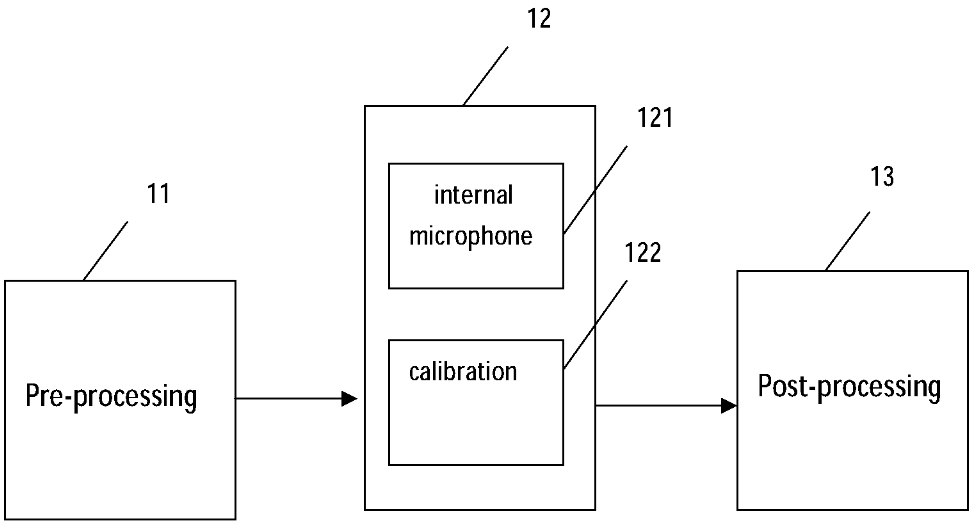
FIG. 2 illustrates a speaker system comprising a room calibration system in accordance with one embodiment of the present disclosure.

FIG. 2 illustrates a simple block graph of a speaker system comprising a room calibration system. As shown in FIG. 2, the speaker system 1 comprises a pre-processing system 11, a room calibration system 12 and a post-processing system 13. The pre-processing system 11 is configured to preprocess the input signal (such as Bluetooth music), such as adjusting audio effect, equalization of the music, limiter, volume control, etc. The room calibration system 12 comprises an internal microphone 121 and a calibration module 122 which can be implemented by a processor. The post-processing system 13 receives the calibrated audio signal from the room calibration system 12 and performs post-processing and then presents the audio to the user. The post-processing system 13 may comprises, for example, one or more amplifiers and one or more speakers. In the room calibration system 12, the internal microphone 121 is used to receive a signal from at least one speaker, for example, a left speaker and a right speaker. The calibration module 122 calculates an impulse response of the signal received at the internal microphone from at least one speaker, wherein the internal microphone may be set inside the speaker system. Then, the calibration module 122 performs the room calibration based on the calculated impulse response.

Figure 3:
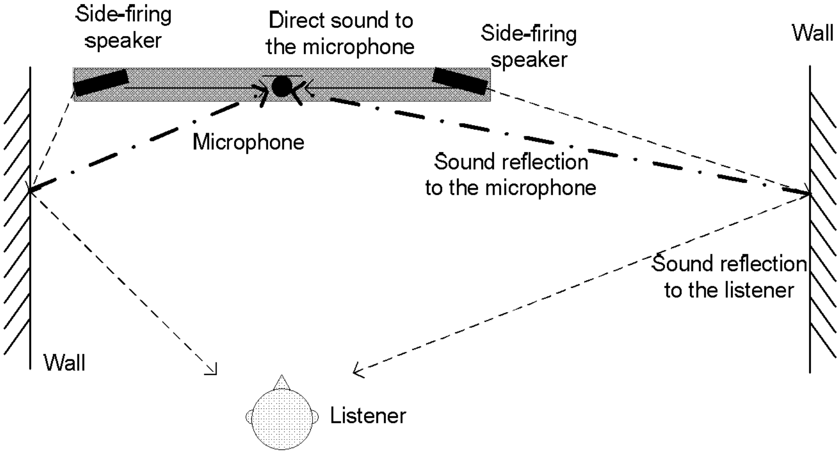
FIG. 3 illustrates a schematic view, which shows a measurement model in accordance with one embodiment of the present disclosure.

FIG. 3 illustrates a schematic view, which shows a measurement model in accordance with one embodiment of the present disclosure. Assuming that the listener sits in front of the soundbar and around its mid-perpendicular line, this is a common case because the soundbar is usually placed under a TV and the user usually faces both the TV and the soundbar with a suitable distance. In As shown in FIG. 3, the internal microphone is positioned on the surface of the soundbar, and is used to predict an acoustic performance at the listening position in the listening area. FIG. 3 shows the internal microphone is positioned on the surface of the soundbar and at center of the soundbar for example. However, the internal microphone can be positioned on any location of a surface of the soundbar. In FIG. 3, for example, a dash line, a solid line and a dot-dash line denote a sound reflection to the listener, a direct sound to the internal microphone and a sound reflection to the internal microphone, respectively.

Referring to FIG. 3, a room calibration method using an internal microphone inside the speaker system is further illustrated. For example, according to one embodiment of the present disclosure, the room calibration system 12 calculates the impulse response of the audio signal received from one speaker by the internal microphone on the soundbar, such as the audio signal from a right side-firing speaker. Then, a room calibration can be performed based on the calculated impulse response of the internal microphone on the soundbar.

For example, the right speaker plays a forward sweep signal x, the internal microphone on the soundbar records the signal $y_{mic}$ and the listener receives the signal $y_{lis}$ which is a pre-estimated value based on the position of the user. They satisfy the following equation, $$y_{mic}=x*h_{mic}, y_{lis}=x*h_{lis} \quad (1)$$

where $h_{mic}$ and $h_{lis}$ are the impulse response of the signal from the speaker to the internal microphone and the impulse response of the signal from the speaker to the listener, respectively. Then, the impulse response of the signal from the speaker to the internal microphone $h_{mic}$ can be obtained by convolving an inverse sweep signal $x_{inv}$ with the $y_{mic}$, $$h_{mic}=x_{inv}*y_{mic} \quad (2)$$

Based on the impulse response of the signal from the speaker to the internal microphone $h_{mic}$, a delay between the left and right impulse response respectively from the left and right speaker at the listening area can be predicted and calibrated.

Figure 4:
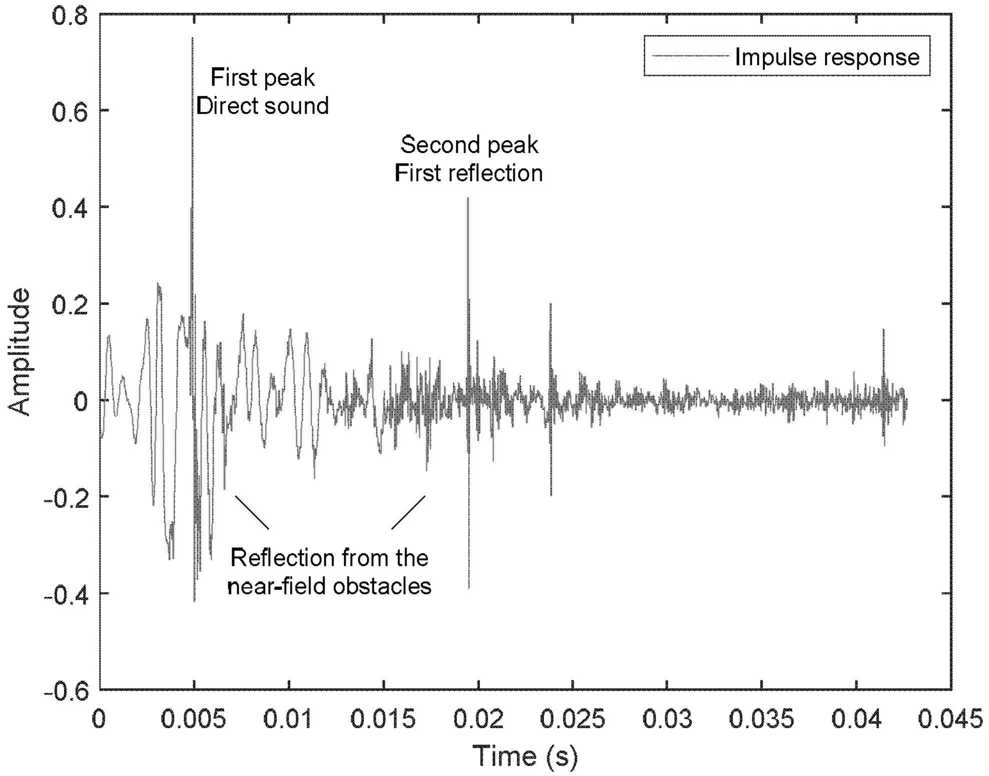
FIG. 4 illustrates one example of the impulse response from the right speaker to microphone according to one embodiment of the present disclosure.
Figure 5:
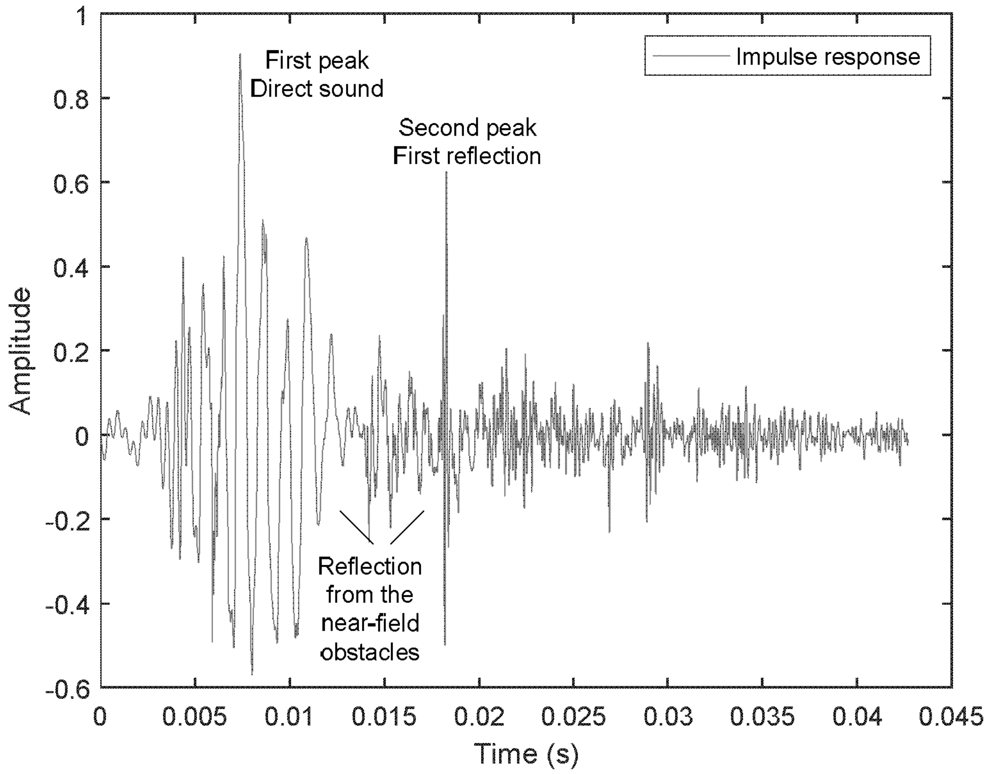
FIG. 5 illustrates one example of the impulse response from the left speaker to microphone according to one embodiment of the present disclosure.

To illustrate further, FIG. 4 and FIG. 5 shows two examples of the $h_{mic}$, wherein FIG. 4 shows one example of the impulse response from the right speaker to internal microphone and FIG. 5 shows the other example of the impulse response from the left speaker to the internal microphone. As shown in FIGS. 4-5, the first peak of the $h_{mic}$ indicates a direct sound while the second peak indicates a first sound reflection from the side obstacle. In most cases, for example, the side obstacle includes the sidewall. The delay sample between the first peak and the second peak indicates the distance from the soundbar to the sidewall. In order to balance the left and right speaker, the delay difference $delay_{LR}$ between the left and the right impulse response can be calculated by the following equation, $$delay_{LR}=(N_{L\_p2}-N_{L\_p1})-(N_{R\_p2}-N_{R\_p1}) \quad (3)$$

wherein $N_{L\_p1}$, $N_{L\_p2}$, $N_{R\_p1}$ and $N_{R\_p2}$ are the indices of the first peaks and the second peaks of the left and right channel impulse responses, respectively.

If the microphone is positioned at the center point of the left and right speakers, the $N_{L\_p1}$ and $N_{R\_p1}$ should be almost the same, then the equation (3) becomes the following equation (4).

$$delay_{LR}=N_{L\_p2}-N_{R\_p2} \quad (4)$$

Hence, the delay between the left and right speaker at the listening area, i.e., $delay_{LR\_lis}$, can be predicted and calibrated based on the $delay_{LR}$, $$delay_{LR\_lis}=\alpha\cdot delay_{LR} \tag{5}$$

wherein α is a tuning parameter depending on a directional angle of the side-firing speaker, and it may be ranged from 1 to 3.

Then, the left delay of the left speaker and the right delay of the right speaker at the listening area can be calibrated respectively, based on the delay between the left and the right speaker at the listening area, $delay_{LR\_lis}$.

If the $delay_{LR\_lis}$ is positive, then a $delay_{L\_lis}$ and a $delay_{R\_lis}$ are calibrated by:

$$delay_{L\_lis}=0 \text{ and } delay_{R\_lis}=delay_{LR\_lis}; \tag{6}$$

otherwise, the $delay_{L\_lis}$ and the $delay_{R\_lis}$ are calibrated by:

$$delay_{R\_lis}=0 \text{ and } delay_{L\_lis}=-delay_{LR\_lis} \tag{7}$$

wherein, the $delay_{L\_lis}$ indicates a delay of the left speaker at the listening area, and the $delay_{R\_lis}$ indicates a delay of the right speaker at the listening area.

Moreover, based on the impulse response of the signal from the speaker to the internal microphone $h_{mic}$, sound levels of the left and the right channels of the left and the right speakers can be predicted and calibrated.

For example, the left sound level of the left speaker can be calibrated according to the left impulse response received at the internal microphone from the left speaker $h_{mic\_left}$, and the right sound level of the right speaker can be calibrated according to the right impulse response received at the internal microphone from the right speaker $h_{mic\_right}$. As described above, the $h_{mic\_left}$ and $h_{mic\_right}$ can be respectively calculated referring to equations (1) and (2). For example, $$y_{mic\_left}=x*h_{mic\_left}, y_{lis}=x*h_{lis} \tag{8}$$

$$y_{mic\_right}=x*h_{mic\_right}, y_{lis}=x*h_{lis} \tag{9}$$

$$h_{mic\_left}=x_{inv}*y_{mic\_left} \tag{10}$$

$$h_{mic\_right}=x_{inv}*y_{mic\_right} \tag{11}$$

Then, a left sound level of the left speaker $level_L$ and a right sound level of the right speaker $level_R$ can be calculated, based on the calculated left impulse response $h_{mic\_left}$ of the signal received at the internal microphone and the calculated left impulse response $h_{mic\_right}$ of the signal received at the internal microphone.

For example, $$level_{Target}=\sqrt{\frac{1}{M}\sum_{i=1}^{M}h_{mic\_target}^2(i)}, \tag{12}$$

$$level_L=\sqrt{\frac{1}{M}\sum_{i=1}^{M}h_{mic\_left}^2(i)}, \text{ and} \tag{13}$$

$$level_R=\sqrt{\frac{1}{M}\sum_{i=1}^{M}h_{mic\_right}^2(i)}, \tag{14}$$

wherein M is the length of the $h_{mic\_target}$, $h_{mic\_target}$ is an expected target impulse response of the audio signal received at the internal microphone, and wherein $level_{Target}$ indicates the calculated sound level based on the target impulse response, $level_L$ indicates the calculated left sound level of the left speaker, and $level_R$ indicates the calculated right sound level of the right speaker.

Then, the gain of the left speaker $gain_L$ and the gain of the right speaker $gain_R$ can be calibrated. For example $$gain_L=level_{Target}-level_L \text{ and} \tag{15}$$

$$gain_R=level_{Target}-level_R \tag{16}$$

In addition, the left equalization, $equalization_L$ of the left speaker can be calibrated according to the left impulse response received at the internal microphone from the left speaker $h_{mic}$ left, and the right sound level equalization, $equalization_L$ of the right speaker can be calibrated according to the right impulse response received at the internal microphone from the right speaker $h_{mic\_right}$.

For example, the target frequency response $FR_{Target}$, the left frequency response $FR_L$, and the right frequency response $FR_R$ can be given by:

$$FR_{Target}=|FFT(h_{mic\_target})|, \tag{17}$$

$$FR_L=|FFT(h_{mic\_left})| \tag{18}$$

$$FR_R=|FFT(h_{mic\_right})| \tag{19}$$

wherein FFT is Fast Fourier Transform and |*| is an absolute operator.

Then, for example, the equalizations of the left and right speakers can be calibrated by:

$$equalization_L=FR_{Target}-FR_L \tag{20}$$

$$equalization_R=FR_{Target}-FR_R \tag{21}$$

Figure 6:
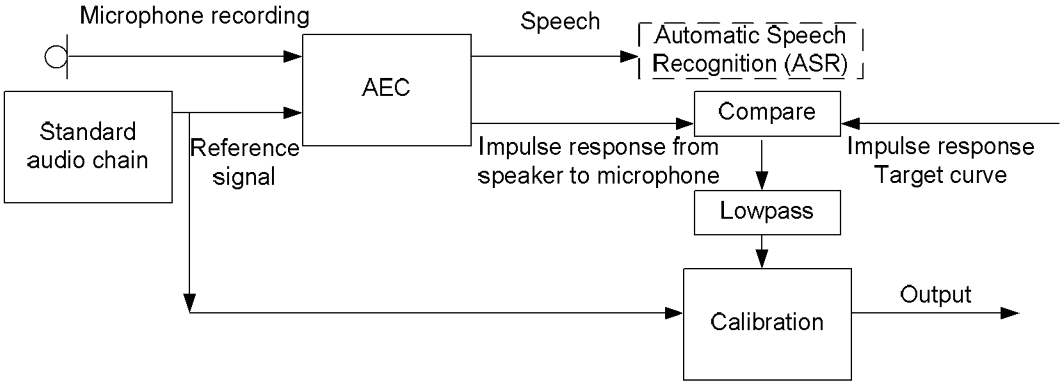
FIG. 6 illustrates a signal flow graph according to another embodiment of the present disclosure.

FIG. 6 illustrates a signal flow graph according to another embodiment of the present disclosure. As shown in FIG. 6, the system may comprise at least one smart speaker inside which at least one internal microphone is built for an Acoustic Echo Cancellation (AEC) for self-tuning. This entails that, at least one the internal microphone can be built inside the left and/or right speaker. The AEC is designed to cancel an acoustic feedback between a speaker and a microphone in the speaker system. For example, when at least one speaker plays music, for example a left speaker and a right speaker, the internal microphone records the music from within the speaker and the internal microphone also records the speech from the listener. The AEC module can analyze the recorded signal and a reference music signal, and then extract the speech from the mixed signal and then input the speech signal to an Automatic Speech Recognition (ASR). The reference music signal is input from a standard audio chain which is usually used to preprocess the input signal (such as Bluetooth music), such as adjusting audio effect, equalization of the music, limiter, volume control, etc. Thus, in this speaker system including an AEC module, the speaker system can be calibrated while the music is playing, instead of playing a forward sweep signal at first.

As can be seen in FIG. 6, some part of the AEC signal chain is reused, which outputs the impulse response of the speaker system in the room. For example, the AEC is estimating the impulse response of sound signal from the left speaker or from the right speaker to the internal microphone, thus the system can cancel the reference signal convolving the impulse response and obtain the clean speech. This impulse response can be regarded as the in-situ measurement of the impulse response of the left and right speaker. As shown in FIG. 6, a target curve of impulse response of the speaker can be preset, and then it is compared with the in-situ measured impulse response. The calibration is effective on the speaker playback once there is some difference between the measured frequency response and the target frequency response.

Different with the external microphone measurement at the listening area, the internal microphone can only measure the mid-low frequency response accurately because of an acoustic near field theory and a stronger directivity of speaker in the high frequency range. Therefore, only a mid-low frequency response of the sound signal is calibrated with the internal microphone.

For example, the left impulse response of the signal from the left speaker to the internal microphone inside the speaker $h_{mic}$ left and the right impulse response of the signal from the right speaker to the internal microphone inside the speaker $h_{mic\_right}$, can be calculated by the AEC module.

Then, the left equalization, $equalization_L$ of the left speaker can be calibrated according to the left impulse response received at the internal microphone from the left speaker $h_{mic}$ left, and the right sound level equalization, $equalization_L$ of the right speaker can be calibrated according to the right impulse response received at the internal microphone from the right speaker $h_{mic\_right}$.

For example, the target frequency response $FR_{Target}$, the left frequency response $FR_L$, and the right frequency response $FR_R$ can be given by:

$$FR_{Target}=|FFT(h_{mic\_target})|, \quad (22)$$

$$FR_L=|FFT(h_{mic\_left})| \quad (23)$$

$$FR_R=|FFT(h_{mic\_right})| \quad (24)$$

wherein FFT is Fast Fourier Transform and |*| is an absolute operator.

Then, for example, the equalizations of the left and right speakers can be calibrated by:

$$equalization_L=FR_{Target}-FR_L \quad (25)$$

$$equalization_R=FR_{Target}-FR_R \quad (26)$$

The method and the system in the aforesaid embodiments of the present disclosure may realize an improved room calibration method and system that can be convenient and effective for a user to perform in-situ measurements and accordingly perform a room calibration so as to obtain better sound experience.

It will be understood by persons skilled in the art, that one or more modules, processes or sub-processes described in connection with FIGS. 1-6 may be performed by hardware and/or software. If the process is performed by software or the module is implemented by software, the software may reside in software memory (not shown) in a suitable electronic processing component or system, and may be executed by the processor. The software in the memory may include executable instructions for implementing logical functions (that is, "logic" that may be implemented either in digital form such as digital circuitry or source code or in analog form such as analog circuitry or an analog source such as an analog electrical signal), and may selectively be embodied in any computer-readable medium for use by or in connection with an instruction execution system, apparatus, or device. The computer readable medium may selectively be, for example, but is not limited to, an electronic, magnetic, optical, electromagnetic, infrared, or semiconductor system, apparatus or device, such as, a RAM, a ROM, an EPROM, etc.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the disclosure have been described, it will be apparent to those of ordinary skill in the art that many more embodiments and implementations are possible that are within the scope of the disclosure. Accordingly, the disclosure is not to be restricted except in light of the attached claims and their equivalents.

The invention claimed is:

1. A method for a room calibration in a speaker system, comprising:
- calculating an impulse response of a sound signal received at an internal microphone from at least one speaker; and
- performing the room calibration based on the calculated impulse response,
- wherein the internal microphone is positioned on a surface of a soundbar in the speaker system;
- wherein calculating the impulse response of the sound signal received at the internal microphone from the at least one speaker comprising:
- playing a forward sweep signal by one of the at least one speaker;
- recording the sound signal from the one of the at least one speaker by the internal microphone; and
- convolving an inverse of the forward sweep signal with the sound signal recorded by the internal microphone.

2. The method of claim 1, wherein the internal microphone is positioned inside one of the at least one speaker in the speaker system.

3. The method of claim 2, wherein calculating the impulse response of the sound signal received at the internal microphone from one of the at least one speaker comprising:
- calculating the impulse response of the sound signal received at the internal microphone from one of the at least one speaker by an Acoustic Echo Cancellation (AEC) module.

4. The method of claim 1, wherein the at least one speaker comprises a left speaker and a right speaker, the impulse response comprises a left impulse response and a right impulse response, the method further comprising:
- calibrating a delay between the left speaker and the right speaker at a listener area, respectively based on the calculated left impulse response and the calculated right impulse response.

5. The method of claim 1, wherein the at least one speaker comprises a left speaker and a right speaker, the impulse response comprises a left impulse response and a right impulse response, the method further comprising:

calibrating a left gain of the left speaker and a right gain of the right speaker, respectively based on the calculated left impulse response and the calculated right impulse response.

6. The method of claim 1, wherein the at least one speaker comprises a left speaker and a right speaker, the impulse response comprises a left impulse response and a right impulse response, the method further comprising:

calibrating a left equalization of the left speaker and a right equalization of the right speaker, respectively based on the calculated left impulse response and the calculated right impulse response.

7. The method of claim 3, wherein the at least one speaker comprises a left speaker and a right speaker, the impulse response comprises a left impulse response and a right impulse response, the method further comprising:

calibrating a left equalization of the left speaker and a right equalization of the right speaker, respectively based on the calculated left impulse response and the calculated right impulse response.

8. A system for a room calibration in a speaker system, comprising:

an internal microphone configured to record a sound signal from at least one speaker; and a processor configured to:

calculate an impulse response of the sound signal received at an internal microphone; and perform the room calibration based on the calculated impulse response, wherein the internal microphone is positioned inside one of the at least one speaker in the speaker system, and wherein the processor is further configured to:

play a forward sweep signal by one of the at least one speaker;

record the sound signal from the one of the at least one speaker by the internal microphone; and convolve an inverse of the forward sweep signal with the sound signal recorded by the internal microphone.

9. The system of claim 8, wherein the internal microphone is positioned inside one of the at least one speaker in the speaker system.

10. The system of claim 9, wherein the system further comprises an Acoustic Echo Cancellation (AEC) module, the AEC module is configured to calculate the impulse response of the sound signal received at the internal microphone from one of the at least one speaker.

11. The system of claim 8, wherein the at least one speaker comprises a left speaker and a right speaker, the impulse response comprises a left impulse response and a right impulse response; and wherein the processor is further configured to calibrate a delay between the left speaker and the right speaker at a listener area, respectively based on the calculated left impulse response and the calculated right impulse response.

12. The system of claim 8, wherein the at least one speaker comprises a left speaker and a right speaker, the impulse response comprises a left impulse response and a right impulse response; and wherein the processor is further configured to calibrate a left gain of the left speaker and a right gain of the right speaker, respectively based on the calculated left impulse response and the calculated right impulse response.

13. The system of claim 8, wherein the at least one speaker comprises a left speaker and a right speaker, the impulse response comprises a left impulse response and a right impulse response; and wherein the processor is further configured to calibrate a left equalization of the left speaker and a right equalization of the right speaker, respectively based on the calculated left impulse response and the calculated right impulse response.

14. The system of claim 10, wherein the at least one speaker comprises a left speaker and a right speaker, the impulse response comprises a left impulse response and a right impulse response, the processor is further configured to:

calibrate a left equalization of the left speaker and a right equalization of the right speaker, respectively based on the calculated left impulse response and the calculated right impulse response.

15. A computer-program product embodied in a non-transitory computer readable medium that is programmed a room calibration in a speaker system, the computer-program product comprising instructions for:

calculating an impulse response of a sound signal received at an internal microphone from at least one speaker; and performing the room calibration based on the calculated impulse response, wherein calculating the impulse response of the sound signal received at the internal microphone from the at least one speaker comprising:

playing a forward sweep signal by one of the at least one speaker;

recording the sound signal from the one of the at least one speaker by the internal microphone; and convolving an inverse of the forward sweep signal with the sound signal recorded by the internal microphone.

* * * * *